United States Patent [19]

Bruckner et al.

[11] Patent Number: 5,546,495
[45] Date of Patent: Aug. 13, 1996

[54] SPLICE TRAY RACK AND CABINET FOR FIBER OPTIC CABLES

[75] Inventors: Carl M. Bruckner; Edward E. Calhoun, III, both of Washington; Matthew J. Fasnacht, Mount Joy; Ronald R. Schaffer, Harrisburg; Francis J. Shay, Palmyra, all of Pa.

[73] Assignee: The Whitaker Corporation, Wilmington, Del.

[21] Appl. No.: 49,055

[22] Filed: Apr. 16, 1993

[51] Int. Cl.⁶ .................................................. G02B 6/00
[52] U.S. Cl. ........................................ 385/135; 385/137
[58] Field of Search .................................. 385/135, 134, 385/136, 137

[56] References Cited

U.S. PATENT DOCUMENTS

| 4,717,231 | 1/1988 | Dewez et al. | 385/135 |
|---|---|---|---|
| 4,792,203 | 12/1988 | Nelson et al. | 385/135 |
| 5,100,221 | 3/1992 | Carney et al. | 385/135 |
| 5,129,030 | 7/1992 | Petrunia | 385/135 |
| 5,142,606 | 8/1992 | Carney et al. | 385/134 |
| 5,142,607 | 8/1992 | Petrotta et al. | 385/135 |
| 5,163,988 | 11/1992 | Setaishi et al. | 65/4.1 |
| 5,167,001 | 11/1992 | Debortoli et al. | 385/135 |
| 5,208,894 | 5/1993 | Johnson et al. | 385/135 |

OTHER PUBLICATIONS

Search Report, Appln. No. 94301842.4, Aug. 22, 1994.

*Primary Examiner*—John D. Lee
*Assistant Examiner*—Phan T. H. Palmer
*Attorney, Agent, or Firm*—Anton P. Ness

[57] ABSTRACT

An optical fiber splice tray rack and cabinet for holding optical fiber splice trays that enclose splices in optical fibers. The splice tray rack has shelves attached to a back panel, each shelf has a support surface extending from the back panel to a lip that projects from the support surface opposite the back panel to define a tray receiving region for receiving one of the splice trays, and a resilient member that acts generally parallel to the support surface of each shelf for holding the splice tray within the tray receiving region. The box-like cabinet has sides defining a cabinet interior and a tie-down bar attached to the cabinet within the cabinet interior for individually securing the protective outer jacket, the inner jacket and the strength member thereto.

24 Claims, 4 Drawing Sheets

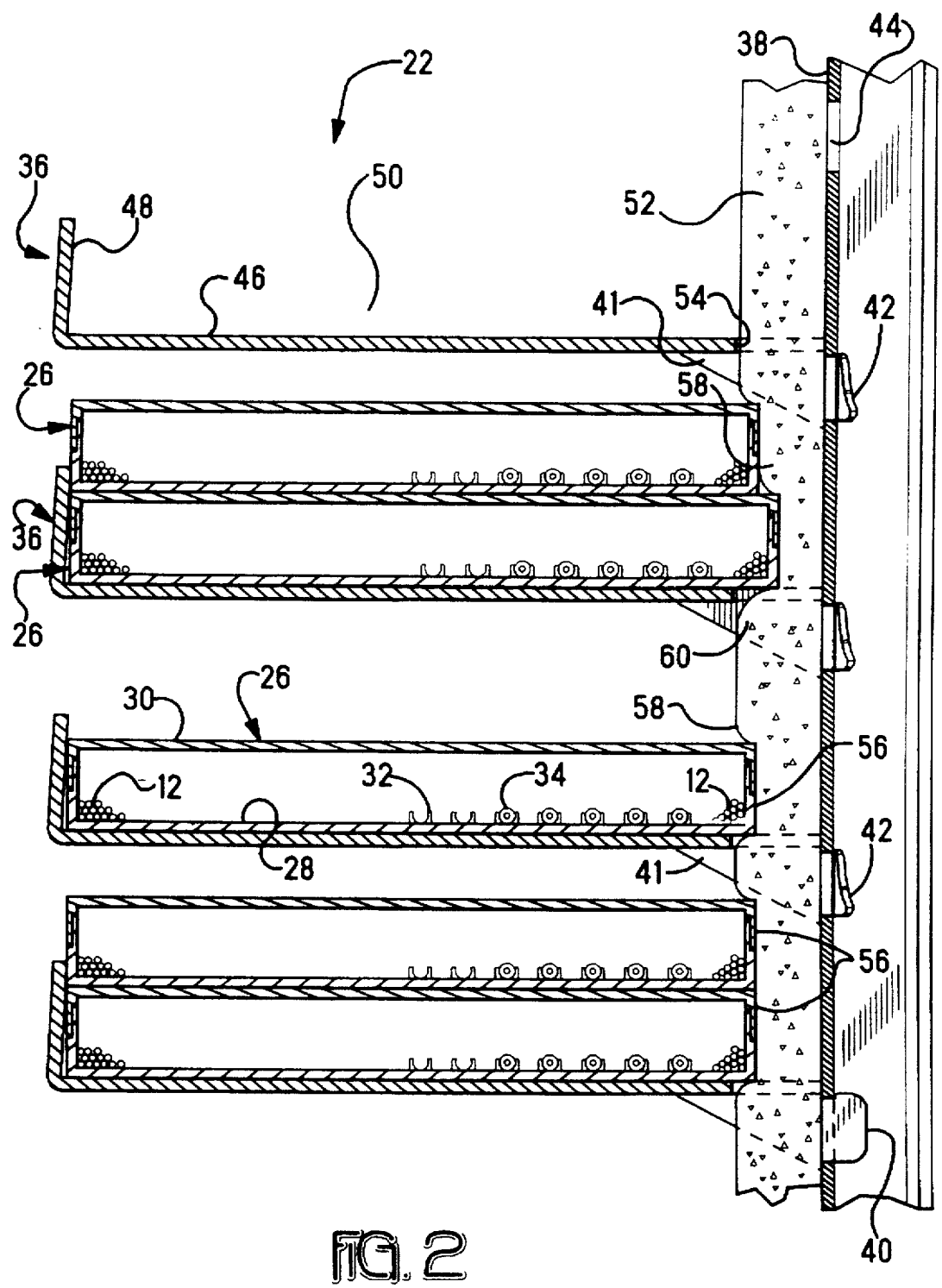

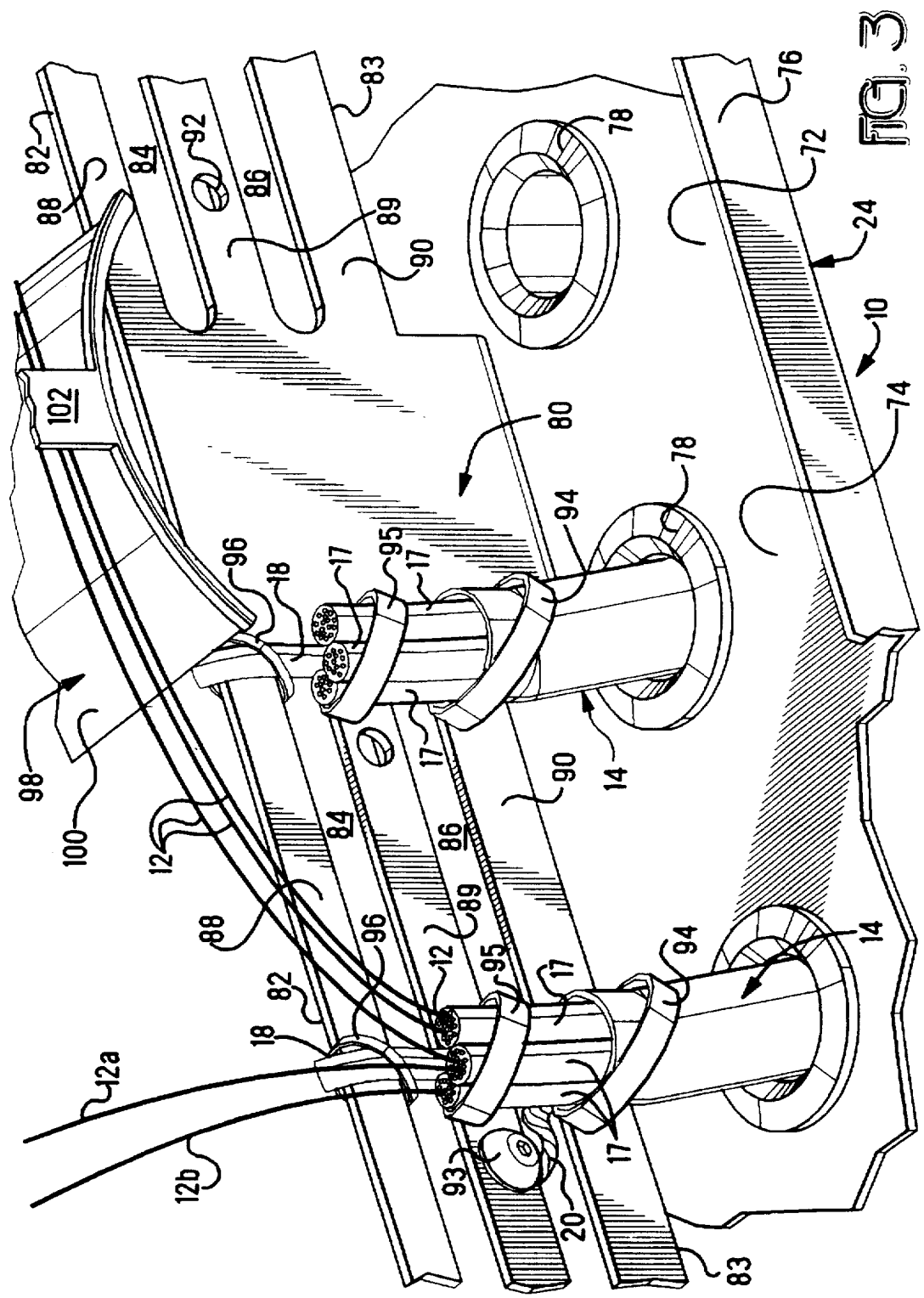

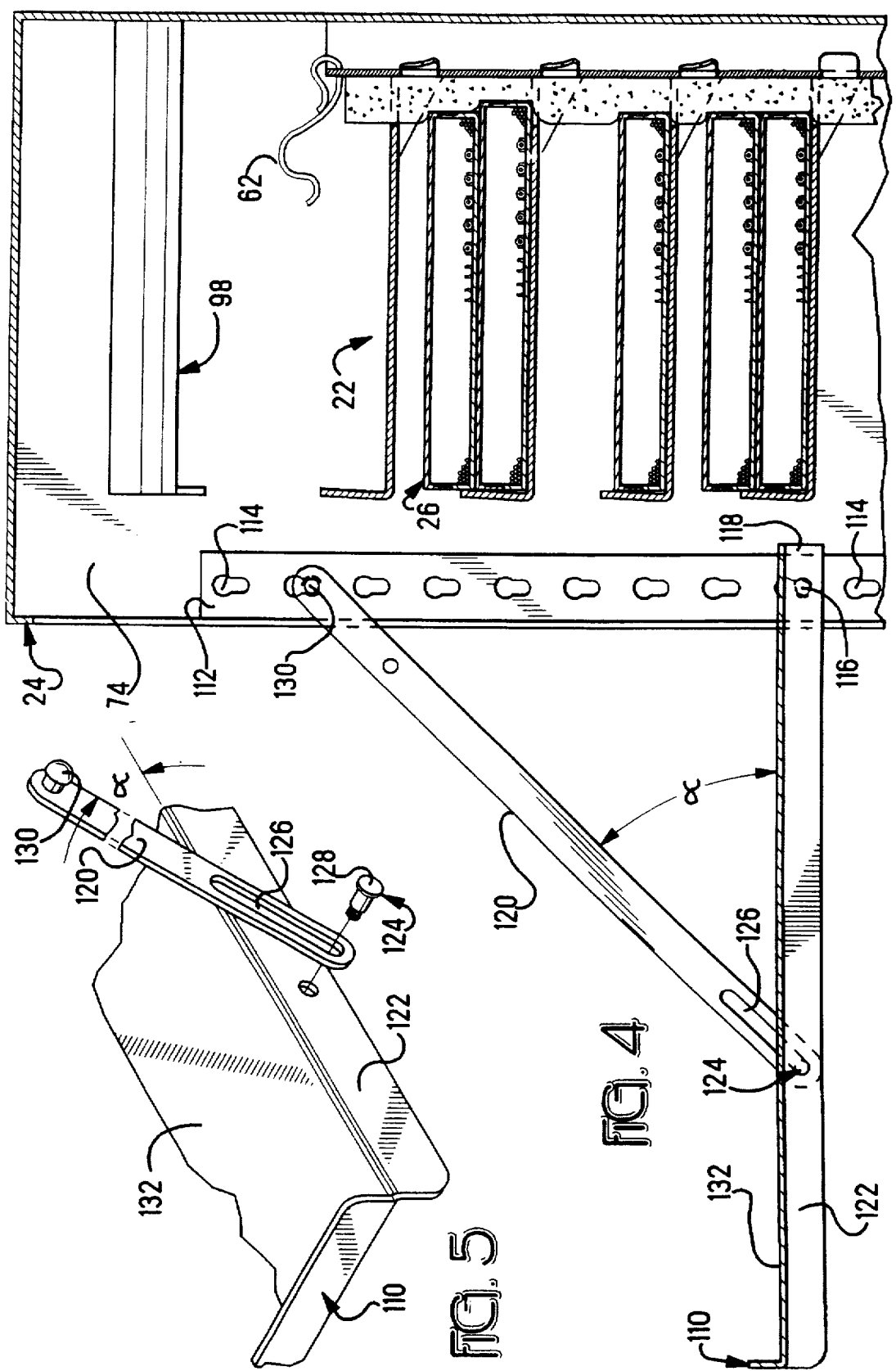

SPLICE TRAY RACK AND CABINET FOR FIBER OPTIC CABLES

FIELD OF THE INVENTION

The present invention relates to a cabinet for holding splice trays having spliced optical fibers therein.

BACKGROUND OF THE INVENTION

It is often necessary to splice the ends of optical fibers from one fiber optic cable to corresponding ends of optical fibers from another fiber optic cable. This is accomplished by "breaking-out" a portion of each of the fiber optic cables, whereby the optical fibers therein are exposed by stripping the protective jacket from the fiber optic cable. The corresponding optical fibers are then spliced together using various techniques, such as fusion splicing or mechanical splicing.

A loop that includes the splice is coiled in the spliced optical fibers. This loop is placed within a protective splice tray. These splice trays may be as simple as a rectangular tubular member having two opposing and open sides through which the optical fibers pass. More than one of these spliced loops may be placed within the same splice tray.

In large fiber optic systems, such as telecommunication systems, many optical fibers must be spliced together and these fibers may originate from multiple fiber optic cables. To contain all of these loops, multiple splice trays are required. In order to provide organization and protection for the splices, while still allowing for convenient access to the optical fibers, the splice trays are held in a splice tray rack within a splice tray cabinet.

What is needed is a splice tray rack for holding numerous splice trays of various configurations while permitting easy insertion and withdrawal of the splice trays and the optical fibers therein. What is further required is a fiber optic cable management cabinet that can hold the splice tray rack, the optical fibers of the fiber optic cables and the fiber optical cables themselves in a manner that routes the optical fibers within the cabinet as required and isolates the optical fibers from disturbances of the fiber optic cable.

SUMMARY OF THE INVENTION

The present invention is a splice tray cabinet wherein corresponding optical fibers are spliced together. This is accomplished by "breaking-out" the fiber optic cable, whereby a portion of the protective jacket of the fiber optic cable is stripped from the cable to expose the inner jackets, the optical fibers and the strength members therein. The spliced optical fibers are formed into a loop that includes the splice and placed in a splice tray. The splice tray cabinet includes a splice tray rack contained within a fiber optic cable management cabinet.

The splice tray rack holds the splice trays and includes a back panel; a plurality of shelves attached to the back panel, with each shelf having a support surface extending from the back panel to a lip that projects from the support surface, opposite the back panel, to define a tray receiving region for receiving splice trays; and, a resilient member that acts generally parallel to the support surface for holding the splice tray within the tray receiving region.

The fiber optic cable management cabinet includes a box-like cabinet having sides defining a cabinet interior, where at least one of the sides has an access port for passing the break-out end of the fiber optic cable into the cabinet interior; a tie-down bar fixed to the cabinet and located adjacent to the access port so the fiber optic cable may pass; a first cinch for securing the protective jacket of the fiber optic cable to the tie-down bar; a second cinch for securing the inner jacket of the fiber optic cable to the tie-down bar and a third cinch for securing the strength member to the tie-down bar.

It is an object of this invention to provide a cabinet in which splice trays are held in an easily accessible and organized manner. It is another object of this invention to minimize external stresses on the optical fibers within the cabinet and route those fibers within the cabinet interior.

It is a feature of this invention to have a splice tray rack that includes a shelf having a support surface extending from a back panel to a lip, thereby defining a tray receiving region, and a resilient member that acts generally parallel to the support surface to hold the splice tray within the tray receiving region, with the resilient member being deformable to insert, remove and hold the splice tray. It is another feature of this invention to have the splice rack within a box-like fiber optic cable management cabinet that includes a tie-down bar therein for securing both the fiber optic cable and the cable strength members to the cabinet to isolate the optical fibers from exterior disturbances to the cable. It is yet another feature of this invention to have a plurality of optical fiber bend radius limiters within the cabinet for preventing directional changes from critically approaching the minimum bend radius of the fiber while routing the optical fibers around the cabinet interior. It is yet another feature of this invention to have a work tray that is selectively positionable adjacent one of the shelves so that the respective splice tray may be placed thereupon.

It is an advantage of this invention that extending the lip opposite the back panel expands the tray receiving region to accommodate stacked splice trays. It is another advantage of this invention that the splice tray rack can accommodate various splice tray sizes and configurations. It is yet another advantage of this invention that an elastic sponge may be used as the resilient member and the deformation of the sponge further holds the trays in place by deforming around at least a portion of a side of the splice tray. It is a further advantage of this invention that a grounding member of the fiber optic cable may be attached to the tie-down bar, thereby grounding the fiber optic cable to the cabinet. It is a still further advantage of this invention that the protective outer jacket, the inner jacket, the cable strength members and the ground member of the cable may be all attached to the same tie-down bar to ease installation. It is yet another advantage of this invention that a selectively positionable work tray is storable within the fiber optic cable management cabinet and folds to a horizontal position to provide a work surface at the desired location.

Additional objects features and advantages will be apparent from the following description of the invention.

BRIEF DESCRIPTION OF THE DRAWINGS

The invention will now be described by way of example with reference to the accompanying drawings in which:

FIG. 2 is a cross-sectional view of a portion of a splice tray rack.

FIG. 3 is a perspective view of a portion of the splice tray cabinet of FIG. 1 showing the fiber optic cables attached to the tie-down bar within the splice tray cabinet.

FIG. 4 is a side view of a splice tray cabinet with a work tray extending from the cabinet interior.

FIG. 5 is a partially cut-away perspective view of the work tray.

DETAILED DESCRIPTION OF THE INVENTION

Figure 1:
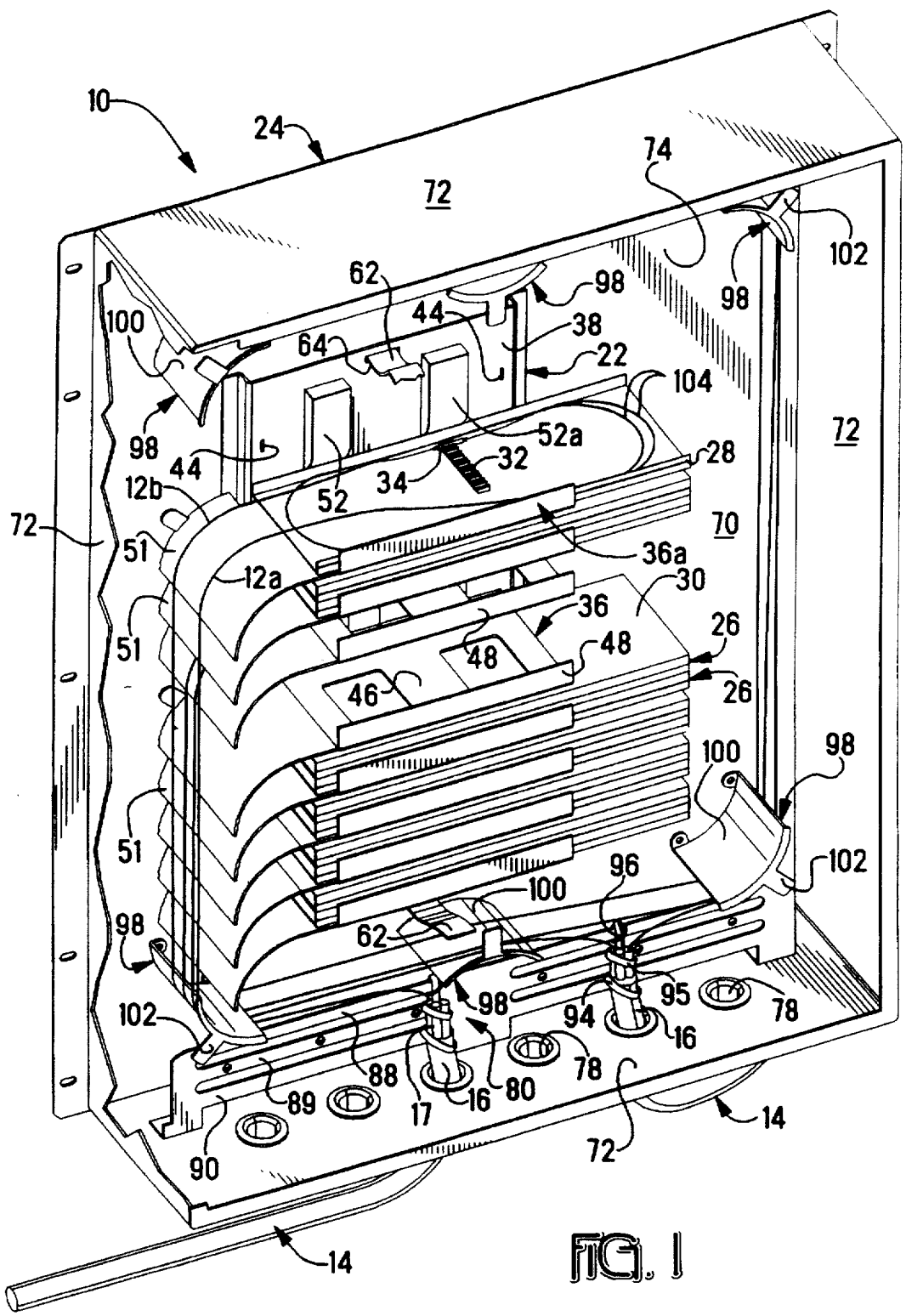
FIG. 1 is a partially cut-away perspective view of a splice tray cabinet.

FIG. 1 shows a splice tray cabinet 10 for organizing and protecting spliced together corresponding optical fibers 12a, 12b that have been "broken-out" of a fiber optic cable 14. The fiber optic cable 14 has a protective outer jacket 16 surrounding an inner jacket 17 containing optical fibers 12, cable strength members 18 (FIG. 3), and a cable grounding member 20. It is not unusual for a fiber optic cable 14 to include 144 or more optical fibers 12. The "breaking-out" process involves stripping a portion of the protective jacket 16, usually around one to three meters, from the fiber optic cable to provide access to the components of the cable 14.

The splice tray cabinet 10 includes a splice tray rack 22 within a fiber optic cable management cabinet 24. Splice tray rack 22 is constructed to hold numerous splice trays 26. Splice trays 26 are constructed to encompass the spliced together optical fibers 12a,12b. In their most general form, the splice trays each have a bottom 28 and a lid 30 that form an rectangular, open-ended tube-like structure so that the optical fibers 12a,12b may pass therethrough. Clips 32 for maintaining position of the splices 34 within each splice trays 26 are attached to the bottom 28 of each splice tray 26.

As shown in FIG. 2, splice tray rack 22 has a plurality of shelves 36 attached to a back panel 38 by deformable tabs 40 on the shelf 36 extending from a support gusset 41. A portion of each deformable tab 42 extends through one of a number of slots 44 in the back panel 38 and is deformed, thereby positively captivating the shelf to the back panel. This enables shelves 36 to be repositioned by straightening the deformed portion of tab 42, removing the shelf from the back panel, inserting tab 40 into another slot 44 and deforming tab 40, whereby shelf 36 is positionable in another location on back panel 38. Shelves 36 could also be attached to back panel 38 by adhesive, welding or other mechanical means, that may or may not enable removal and repositioning of shelves 36.

Each shelf 36 has a support surface 46 that extends from back panel 38 to a lip 48 projecting from support surface 46 generally opposite the back panel 38, whereby a tray receiving region 50 for receiving a splice tray 26 is defined. Support surface 46 may be extended along splice tray 26 to a bend radius (FIG. 1) extending beyond splice tray 26 in a direction that corresponds to the routing of the optical fibers, as discussed below.

Each splice tray 26 is held in a tray receiving region 50 by a resilient member 52 defining a compressible tray-engaging surface opposing and spaced from lips 48 a distance less than the width of a splice tray 26 and acting generally parallel to support surface 46. Individual resilient members, attached either to back panel 38 or lip 48, could be used for each shelf 36. A particularly advantageous resilient member 52 is an elastic foam sponge. In order to prevent pivoting of a splice tray 26 within a tray receiving region 50, two sponges 52,52a are used (see FIG. 1). Sponges 52,52a extend along back panel 38 from above first shelf 36a to below last shelf 36b, passing through cutouts 54, in each of shelves 36. When a splice tray 26 is positioned within receiving region 50 sponges 52,52a undergo local deformation along the end 56 of the splice tray and exert a force on splice tray 26 that pushes it against the lip 48, thereby holding splice tray 26 in place.

As shown in FIG. 2, it is possible to expand tray receiving region 50 to accommodate multiple splice trays 26 stacked on top of each other. This is accomplished by extending lip 48 from support surface 46 a sufficient distance to engage either stacked or single splice trays. In conjunction with the local deformation that the resilient member 52 can sustain, splice tray rack 22 can accommodate splice trays of differing sizes, even within the same stack.

Sponges 52,52a extend along back panel 38 and are locally deformed upon placement of the splice tray 26 within tray receiving region 50. The local deformation produces an upper bulge 58 and a lower bulge 60. Bulges 58,60 overlie and underlie at least a portion of the splice tray stack, thereby further maintaining the splice trays within tray receiving region 50.

Referring to FIGS. 1 and 4, a pair of safety straps 62, is incorporated into splice tray rack 22 for overwrapping splice trays therein, to prevent inadvertent dislodging of the splice trays. Rearward ends of safety straps 62 extend through a top slot 64 and a bottom slot (not shown) in back panel 38, thereby encompassing the splice trays, and are releasable to provide access to the splice trays.

Fiber optic cable management cabinet 24 is an open-faced box-like cabinet having a framework that has a back side 70 and a plurality of connected perimeter sides 72 extending therefrom to define a cabinet interior 74. In order to protect the cabinet interior 74, a removable front side, that generally opposes the back side 70, is connected to the perimeter sides 72. The front side may be a hinged door, a removable panel, or any other configuration that will provide access to cabinet interior 74.

A fiber optic cable 14 passes into cabinet interior 74 through an access port 78 in one of cabinet sides 72, as seen in FIGS. 1 and 3. Ideally, access port 78 is constructed to provide an environmental seal about the protective outer jacket 16 of fiber optic cable 14 to prevent moisture and contaminants from entering cabinet 24.

A tie-down bar 80 is fixed to cabinet 24 within cabinet interior 74 and adjacent to access ports 78 and generally disposed orthogonally to but just offset from the paths of cables extending through the access ports, so that fiber optic cables 14 entering cabinet interior 74 pass thereby without interference. Tie-down bar 80 has a first side 82, a second side 83, an upper slot 84 and a lower slot 86 that define an upper cross member 88, a middle cross member 89 and a lower cross member 90. Holes 92 are included in lower cross member 90 for attaching grounding member 20 of fiber optic cable 14 to the tie-down bar 80 in order to ground cable 14 to cabinet 24. These holes 92 may be tapped for use with a screw 93.

When fiber optic cable 14 enters cabinet interior 74, it crosses tie-down bar 80 along a path that is essentially perpendicular to cross members 88,90. Once inside cabinet interior 74, fiber optic cable 14 is "broken-out" by stripping the protective outer jacket 16 to slightly above access port 78. A first cinch 94 is wrapped around cable 14 and lower cross member 90 securing cable 14 to tie-down bar 80. A second cinch 95 is wrapped around inner jacket 17 and the middle cross member 89 for securing to tie-down bar 80. Strength members 18 are secured thereto by a third cinch 96 that wraps around both the strength members 18 and the upper cross member. Cinches 94,95,96 may be conventional cable ties or more complicated clamps may be incorporated into tie-down bar 80. Any excess length of the strength members and the inner jacket is trimmed as required.

In FIG. 1 and FIG. 3 for clarity of the drawings, a spliced optical fiber 12a,12b is used as a representative example of the many optical fibers 12 that would actually be within the cabinet interior 74. Optical fibers 12a,12b are routed within cabinet interior 74 by optical fiber bend radius limiters 98 that extend into cabinet interior 74 from the back side 70 of cabinet 24 and have radial sections 100 for supporting optical fiber 12a,12b. An ear 102 extends radially out from radial section 100 for preventing the large number of optical fibers 12 wrapped therearound from coming off of radial section 100. Through the use of bend radius limiters 98, optical fibers 12 from fiber optic cables 14 are routed about the cabinet interior along paths that do not approach the critical minimum optical fiber bend radius. The radius of radial sections 100 shown is approximately two inches.

The corresponding optical fibers 12a,12b that are to be spliced together are routed around cabinet interior 74 to their respective splice tray 26. The radial extension 51 of shelf 36 prevents any bend forming in optical fibers 12a,12b where they enter splice tray 26 from approaching the critical bend radius, as described for bend radius limiters 98. A loop 104 of at least one complete circle is formed with the corresponding optical fibers 12a,12b and a splice 34 created where the corresponding optical fibers 12a,12b are joined. Loop 104, including the associated splice 34, is placed within bottom 28 of the splice tray 26 and splice 34 may be securely positioned within a clip 32 in bottom 28 of splice tray 26.

When a particular splice tray 26 is full, the splice tray is assembled by putting the lid 30 on the bottom 28. Splice tray 26 can then be positioned within the tray receiving region 50 of the appropriate shelf 26, and this process is repeated until the splice tray rack 22 is full. The fiber optic cable management cabinet 24 may include a number of splice tray racks 22 if desired.

Referring now to FIGS. 4 and 5, in order to aid working on the optical fibers 12 a selectively positionable work tray 110 is included in fiber optic cable management cabinet 24. Work tray 110 may be attached to cabinet 24 at various locations that correspond to the shelves 36 of the splice tray rack. Opposing positioners or frames 112 are attached to cabinet 24 within cabinet interior 74 and have multiple first positioning sections or key holes 114 for receiving and captivating a first cooperable positioning section or shoulder pin 116 attached to each rear corner 118 of work tray 110 in order to position the work tray in the desired location. Key holes 114 are constructed so that the positioning pins 116 may be inserted and removed as required to reposition work tray 110.

Work tray support arms 120 are slidably captivated to work tray 110 along the sides 122 of the work tray by shoulder pins 124 that pass through respective slots 126 in support arm 120 and are fixed to respective openings, preferably closed elongated sides 122 of work tray 110, each support arm 120 thereby being captivated between the head 128 of the shoulder pin 124 and the work tray sides. Support arms 120 also have second cooperating positioning sections or pins 130 incorporated at ends opposite the slotted ends. Positioning pin 130 is received in one of the key holes 114 defined second positioning sections of positioner frame 112 spaced along positioning frame 112 vertically from the first positioning section in the same manner as positioning pins 116 of work tray 110. Support arms 120 may assume different angular positions α with the work surface 132 of work tray 110 by selecting a key slot 114 adjacent the second positioning section in order to cover all the desired tray locations vertically along positioners 112. The support arms 120 may assume either a hanging relationship as shown in FIG. 4 where the work tray 110 hangs below the support arms 120, or a supporting relationship (not shown) where the work tray is above the support arms, both whereby the work tray is supported outward from cabinet 24 in an essentially horizontal manner. By disengaging the positioning pins 130 of the support arms from the key holes 114 of the positioners 112, the work tray may be tilted up or down into the cabinet interior. A latch may be provided to keep the work tray 110 in an upright or vertical position within cabinet 24.

It will be appreciated that the present invention has significant advantages and that the above-described embodiment constitutes the presently preferred form of the invention. It should be recognized that the invention can take numerous other forms. Accordingly, the invention should be only limited by the scope of the following claims.

We claim:

1. A fiber optic splice cabinet for encasing the break-out ends of fiber optic cables, each of the fiber optic cables having a plurality of optical fibers within an inner jacket that correspond to optical fibers of another fiber optic cable and cable strength members surrounded by a protective outer jacket, wherein the corresponding optical fibers are spliced together and placed in a splice trays, the fiber optic splice cabinet comprising:

a box-like fiber optic cable management cabinet having
  a plurality of connected sides defining a cabinet interior;
  a plurality of access ports within at least one of the sides, each port constructed to pass the break-out end of one of the fiber optic cables into the cabinet interior;
  a tie-down bar attached to the cabinet within the cabinet interior and located adjacent to the access port so the fiber optic cable can pass thereover, for individually securing the protective outer jacket, the inner jacket and the strength member thereto; and an optical fiber splice tray rack for holding a plurality of optical fiber splice trays within the cabinet interior, having
  a back panel attached to the cabinet;
  a plurality of shelves attached to the back panel, each shelf having a support surface extending from the back panel to a lip that projects from the support surface opposite the back panel to define a tray receiving region for receiving one of the splice trays; and
  a resilient member acting generally parallel to the support surface of each shelf for holding the splice tray within the tray receiving region.

2. A fiber optic splice cabinet of claim 1, wherein the fiber optic management cabinet further includes a plurality of optical fiber bend radius limiters having an arcuate member with a radius larger than the critical radius of the optical fiber mounted within the cabinet interior for routing the optical fibers, whereby directional changes in the optical fiber route occurring along the optical fiber bend radius limiters take place through radii larger than the minimum critical radius of the optical fiber.

3. A fiber optic splice tray cabinet of claim 1, wherein the fiber optic management cabinet has a selectively positionable work tray that is positionable to coincide approximately with a selected said the shelf and extend horizontally from the cabinet interior, whereby a generally horizontal work tray may be provided at each shelf.

4. A fiber optic splice tray cabinet of claim 1, wherein the shelf of the splice tray rack has a bend radius limiter extending from the support surface to support the optical fibers as they enter the splice tray.

5. A fiber optic splice tray cabinet of claim 1, wherein the resilient member is a plurality of elastic foam sponges.

6. A splice tray rack for holding a plurality of splice trays, comprising:
   a back panel;
   a plurality of shelves attached to the back panel, each shelf having a support surface extending from the back panel to a lip that projects from the support surface opposite the back panel to define a tray receiving region for receiving one of the splice trays; and
   a resilient member adjacent the back panel and defining a compressible tray-engaging surface opposing and spaced from said lip a distance less than the width of a said splice tray, the resilient member acting generally parallel to the support surface of each shelf for compressively engaging and holding the splice tray within the tray receiving region upon placement of the splice tray thereinto, in cooperation with said lip.

7. The splice tray rack of claim 6, wherein the resilient member generally elastically surrounds at least a portion of a side of the splice tray, thereby maintaining the splice tray within the tray receiving region.

8. The splice tray rack of claim 7, wherein the resilient member is an elastic foam sponge.

9. The splice tray rack of claim 6, wherein the back panel has a plurality of slots therethrough and each shelf has a tab for attaching the shelf to the back panel, the tab being received within one of the slots and a portion of the tab extends through the back panel and is deformed, whereby the shelf is attached to the back panel.

10. The splice tray rack of claim 6, wherein the lip projects a sufficient distance from the support surface so that the tray receiving region accommodates multiple splice trays stacked on top of each other.

11. The splice tray rack of claim 6, wherein the resilient member is a plurality of elastic foam sponges.

12. A fiber optic cable management cabinet for encasing the break-out end of a fiber optic cable, the fiber optic cable having an optical fiber within an inner jacket and cable strength members surrounded by an outer jacket, the fiber optic cable management cabinet comprising:
   a box-like cabinet having
      a plurality of connected sides defining a cabinet interior;
      a plurality of access ports within at least one of the sides, each port constructed to pass the break-out end of one of the fiber optic cables into the cabinet interior; and
   a tie-down bar attached to the cabinet within the cabinet interior and located adjacent to the access ports and generally disposed orthogonally to paths of fiber optic cables extending through the access ports so that each fiber optic cable can extend therepast, for individually securing the protective outer jacket, the inner jacket and the strength member thereto.

13. A fiber optic cable management cabinet of claim 12, wherein a plurality of optical fiber bend radius limiters having an arcuate member with a radius larger than the critical radius of the optical fiber are mounted within the cabinet interior for routing the optical fibers, whereby directional changes in the optical fiber route occurring along the optical fiber bend radius limiters take place through radii larger than the minimum critical radius of the optical fiber.

14. A fiber optic cable management cabinet of claim 12, wherein the fiber optic cable has a ground member that is attachable to the tie-down bar for electrically grounding the fiber optic cable.

15. A fiber optic cable management cabinet of claim 12, wherein a selectively positionable work tray extends generally horizontally from the cabinet interior.

16. A fiber optic cable management cabinet of claim 12, wherein the tie-down bar has an upper cross member, a middle cross member and a lower cross member for securing the outer protective jacket, the inner jacket and the strength member thereto.

17. A fiber optic cable management cabinet of claim 12, having a first cinch for securing the fiber optic cable to the tie-down bar, a second cinch for securing the inner jacket to the tie-down bar and a third cinch for securing the strength member to the tie-down bar.

18. A fiber optic cable management cabinet of claim 17, wherein the first cinch, the second cinch and the third cinch are cable ties.

19. A fiber optic enclosure with work tray, comprising:
   a framework including a plurality of shelves disposed in a vertical array, and a work tray for mounting to said framework forwardly of said shelves for performance of work on splice trays disposed in respective said shelves;
   said framework including positioning frames along opposed sides of said vertical array of splice tray shelves, each said positioning frame including a first positioning section and at least one second positioning section associated with each said splice tray shelf with each said first positioning section corresponding thereto, and each said at least one second positioning section being spaced vertically from said first positioning section associated with said respective splice tray shelf;
   said work tray including first cooperating positioning sections along respective sides thereof adjacent rearward ends thereof, with said first cooperating positioning section fastenable to said first positioning sections of said positioning frame in a manner permitting unfastening thereof, respectively, for supporting a rearward end of said work tray; and
   said work tray including support arms along respective said sides thereof, with forward ends of said support arms affixed to respective said sides forwardly from said rearward side ends of said work tray for supporting a forward portion of said work tray when said work tray is fastened to said positioning frames, and each said support arm having rearward ends including second cooperating positioning sections fastenable to said second positioning sections of said cabinet in a manner permitting unfastening thereof,
   whereby said work tray is selectively positionable forwardly of said splice tray array to correspond with a selected said splice tray forwardly thereof when said first cooperating positioning sections are fastened to said first positioning sections associated with said selected splice tray, and said second cooperating positioning sections on said support arms are fastened to ones of said second positioning sections associated with said first positioning sections such that said support arms extend to said positioning frames at an angle from said work tray and support said work tray forwardly from said rearward side ends.

20. The enclosure as set forth in claim 19 wherein said first cooperating positioning section is a shoulder pin, and said first positioning section is a pin-receiving slot adapted to receive a said shoulder pin removably thereinto.

21. The enclosure as set forth in claim 19 wherein said second cooperating positioning section is a shoulder pin, and each said at least one positioning section is a pin-receiving slot adapted to receive a said shoulder pin removably insertable thereinto.

22. The enclosure as set forth in claim 19 wherein all said first and second positioning sections are pin-receiving slots, and said first and second cooperating positioning sections are shoulder pins adapted to be removably insertable into said pin-receiving slots.

23. The enclosure as set forth in claim 19 wherein said forward ends of said support arms include openings therethrough, and said tray include shouldered pin members extending through said openings to be affixed to said sides of said tray, affixing said support arm forward ends to said tray in a manner permitting said support arms to be pivoted about said shouldered pin members.

24. The enclosure as set forth in claim 23 wherein said openings through said support arm forward ends are closed elongate slots, permitting said support arms to be pivoted to coextend along said tray sides and to be slid forwardly therealong facilitating storage.

* * * * *